(12) United States Patent
Brunette

(10) Patent No.: US 6,418,009 B1
(45) Date of Patent: Jul. 9, 2002

(54) BROADBAND MULTI-LAYER CAPACITOR

(75) Inventor: Gilbert P. Brunette, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 110 days.

(21) Appl. No.: 09/671,251

(22) Filed: Sep. 28, 2000

(51) Int. Cl.$^7$ ................................................ H01G 4/228
(52) U.S. Cl. ............................... 361/306.3; 361/306.1; 361/311; 361/312; 361/301.4
(58) Field of Search ...................... 361/502, 303, 361/306.1, 308.1, 313, 321.2, 306.2, 309, 312, 306.3, 301.4, 311, 301.3

(56) References Cited

U.S. PATENT DOCUMENTS

| | | | |
|---|---|---|---|
| 4,274,124 A | 6/1981 | Feinberg et al. | 361/275 |
| 4,665,465 A | * 5/1987 | Tanabe | 361/306 |
| 4,706,162 A | 11/1987 | Hernandez et al. | 361/306 |
| 5,561,587 A | * 10/1996 | Sanada | 361/306.1 |
| 5,576,925 A | * 11/1996 | Gorowitz et al. | 361/301.2 |
| 5,812,363 A | * 9/1998 | Kuroda et al. | 361/306.3 |
| 5,880,925 A | 3/1999 | Dupre et al. | 361/303 |
| 6,088,215 A | * 7/2000 | Webb et al. | 361/306.3 |
| 6,144,547 A | * 11/2000 | Retseptor | 361/303 |
| 6,191,933 B1 | * 2/2001 | Ishigaki et al. | 361/309 |
| 6,243,253 B1 | * 6/2001 | DuPre et al. | 361/306.3 |

OTHER PUBLICATIONS

Dielectric Laboratories, "Product Specification C08 0805", www.dilabs.com, printed on Aug. 29, 2000.
Dielectric Laboratories, "Product Specification C06 0603", www.dilabs.com, printed on Aug. 29, 2000.

* cited by examiner

*Primary Examiner*—Dean A. Reichard
*Assistant Examiner*—Nguyan Thuc Ha

(57) ABSTRACT

The invention relates to a hybrid capacitor which combines the functionality of a multi-layer capacitor and a single layer capacitor in one component. The multi-layer capacitor component is comprised of a series of interleaved plates alternatively connected to two terminations and spaced apart by a dielectric material. The single layer capacitor component is comprised of the outer of the series of interleaved plates and an additional plate connected to the opposite termination as the outer interleaved plate and separated from that plate by a second dielectric material. This combination of an SLC and an MLC into a single hybrid capacitor facilitates easy assembly and improves electrical performance over using a separate multi-layer capacitor and a single layer capacitor.

24 Claims, 2 Drawing Sheets

BROADBAND MULTI-LAYER CAPACITOR

FIELD OF THE INVENTION

This invention relates generally to components for electronic circuits and, more particularly to multi-layer surface-mount capacitors.

BACKGROUND OF THE INVENTION

Two types of surface-mount capacitors are typically used in the design of electronic circuits. They are multi-layer capacitors (MLCs) and single layer capacitors (SLCs). MLCs typically have a capacitance value in a range of 0.1 pico-Farads to 0.2 micro-Farads or more while SLCs typically have a capacitance value of less than 0.05 pico-Farads to 1800 pico-Farads or more.

The choice of the type of capacitor depends on the electrical characteristics required. An MLC has a low insertion loss at low frequencies and therefore has a good low frequency response. In contrast, an SLC has a low insertion loss at high frequencies and therefore has a good high frequency response. In some cases it is desirable to combine the characteristics of both the SLC and the MLC to obtain a broadband device. This is typically done by putting an MLC component and an SLC component electrically in parallel with each other. However, simply mounting an MLC component and a separate SLC component adjacent each other on a substrate, splitting the electrical trace entering the capacitors and recombining the electrical trace on the opposite side of the capacitors results in losses which are unacceptable at high frequencies.

Another method which has been utilized for putting an MLC electrically in parallel with an SLC is to mount an MLC on top of an SLC. However, there are problems inherent in this method because MLCs and SLCs are of significantly different physical size. To overcome the size difference, an SLC is mounted with one end in contact with a first side of an electrical trace and the second end is connected to the second side of the electrical trace by a flexible connection. An MLC is then mounted at an angle over the-SLC such that it is mounted directly in contact with the second side of the electrical trace and is connected to the first side of the electrical trace by a flexible connection. Although this configuration has enhanced electrical characteristics, it is expensive to manufacture. Rather than being assembled by an automated pick-and-place machine, this configuration must be assembled manually.

SUMMARY OF THE INVENTION

The present invention is directed to an improved hybrid capacitor. The capacitor combines the functionality of an SLC and an MLC into one electrical component. An MLC is typically composed of interleaved electrically conductive plates which are alternatively electrically connected to one of two electrical terminations, at opposite ends of the capacitor component. The interleaved plates are spaced apart by a dielectric material which may also cover the outer surfaces of the outer-most plates. Where the plates are not equidistantly spaced, several different dielectric materials may be used between the pairs of plates of the MLC.

An SLC is created in the same componeat by substituting a different dielectric material to cover one of the outermost plates and extending an additional interleaved plate on the outside of the different dielectric material. In addition to the change in the dielectric materials the additional plate on the outside of the different dielectric material may have a significantly different geometry than the interleaved plates. In particular, it may only overlay the next adjacent plate slightly. Additionally, the next adjacent plate may be altered in geometry to further alter the electrical characteristics of the SLC, such as mug the next adjacent plate wedge shaped. The result is that the SLC has a significantly different capacitance value than the MLC.

Advantageously, the functionality of two electrical components, an SLC and an MLC, have been combined into one electrical component which can be used in high speed applications as a direct current blocking-capacitor or for broadband decoupling on power supply rails.

Also advantageously, the component of the present invention can be mounted on a substrate by the use of an automated pick-and-place machine. The time and cost required to mount the individual component is less than required to mount separate components.

A further advantage-of the present invention is that it has improved electrical performance over prior options. Specifically, the choice of dielectric material and plate configurations can be chosen to produce an insertion loss that is minimized and has a flattened response to frequency. The dielectric material used between the plates of the SLC can be chosen to achieve the desired high frequency response while the dielectric material used between the plates of the MLC can be higher such that the low frequency insertion loss would be small.

Other aspects and features of the invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE EMBODIMENT

Figure 1:
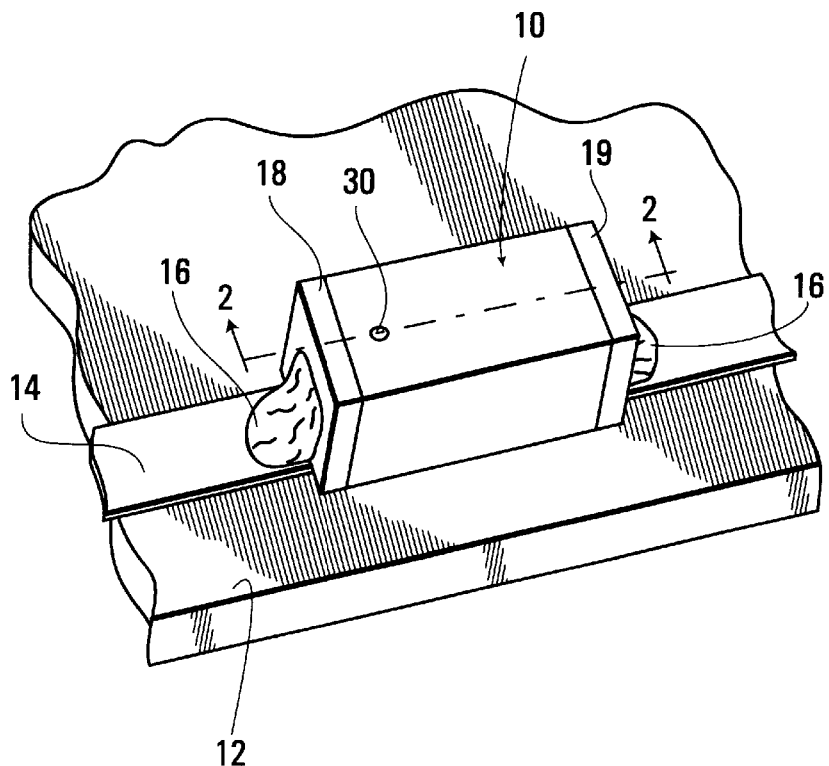
FIG. 1 is a perspective view of a hybrid SLC and MLC mounted on a substrate in accordance with an embodiment of the present invention.

FIG. 1 shows a hybrid SLC and MLC 10 according to the present invention mounted on a substrate 12. The substrate 12 is typically a high frequency printed circuit board (typically made of a Teflon* or a ceramic material) but may be any type of substrate designed to carry electrical signals. A conductive electrical trace 14 is defined on the substrate 12. Where the substrate 12 is a printed circuit board, the conductive electrical trace 14 is generally composed of a copper alloy, gold plated tungsten, gold on nickel on copper, copper with a solder coating, or other metallic combination of materials known in the art.

The hybrid capacitor 10 has a unitary rectangular body shape and has a conductive termination 18 at one end and a conductive termination 19 at the other end for attachment to the conductive electrical trace 14. The conductive terminations 18 and 19 are typically comprised of conductive metal alloys such as nickel and solder, palladium silver, gold plated on nickel, or other metallic material known in the art. An orientation dot 30 is a visual marker which indicates the top of the hybrid capacitor 10.

The hybrid capacitor 10 is positioned on the conductive electrical trace 14 and the hybrid capacitor 10 is mechanically an electrically connected to the conductive electrical trace 14 by an adhesive 16 which is normally either a solder or a conductive epoxy. Where the adhesive 16 is a solder, it is typically a eutectic tin-lead solder paste which is reflowed to bond the hybrid capacitor 10 to the conductive electrical trace 14. Alternatively, where the adhesive 16 is a conductive epoxy, the conductive epoxy is first applied to the conductive electrical trace 14. The hybrid capacitor 10 is then positioned on the conductive electrical trace 14 and the assembly is baked to cure the conductive epoxy until it is hardened and bonds the hybrid capacitor 10 to the conductive electrical trace 14.

Figure 2:
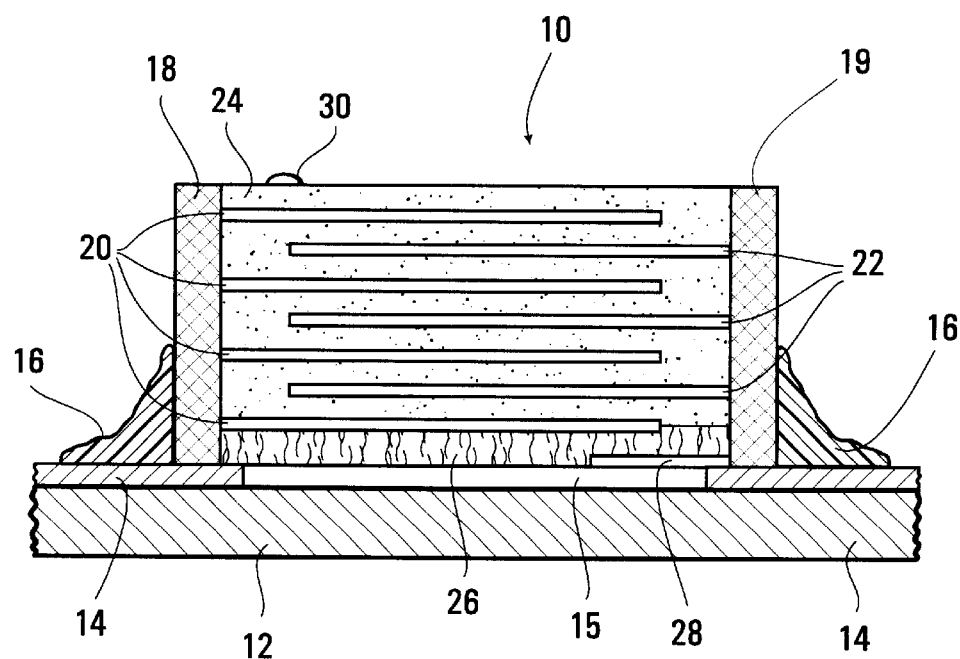
FIG. 2 is a cross sectional view drawn to a larger scale of the hybrid capacitor of FIG. 1 taken along line 2—2 of FIG. 1.

Turning to FIG. 2, it can be seen that the conductive electrical trace 14 is not continuous beneath the hybrid capacitor 10. Rather, a gap 15 separates the trace into two parts and the hybrid capacitor 10 interconnects the two parts of the conductive electrical trace 14.

FIG. 2 also depicts the interior of the hybrid capacitor 10. The interior of the hybrid capacitor 10 is comprised of a set of conductive plates 20 and a set of opposed conductive plates 22. The length of the conductive plates 20 and 22 extends in a direction between the conductive terminations 18 and 19 while the width of conductive plates 20 and 22 extends perpendicular to that direction. Although the conductive plates 20 extend towards the conductive termination 19, the conductive plates 20 do not mechanically or electrically connect to the conductive termination 19. Similarly, the conductive plates 22 extend towards the conductive termination 18 but do not mechanically or electrically contact it. Both the conductive plates 20 and the opposed conductive plates 22 are rectangular in shape and substantially the same width as the hybrid capacitor 10. In the present embodiment, the conductive plates 20 and 22 are equidistantly spaced. However, in other embodiments, non-uniformly spaced plates may be employed. The conductive plates 20 and 22 are metallic and may be formed of palladium or other metal or alloy known in the art.

The conductive plates 20 are electrically connected to the conductive termination 18 while the opposed conductive plates 22 are electrically connected to the conductive termination 19. The conductive plates 20 and 22 are interleaved with each other and spaced apart by a dielectric material 24. The dielectric material 24 is typically a ceramic having a relative dielectric constant in the range of 70 to 1200. The dielectric material 24 also coats the top of the outer-most top plate of the conductive plates 20. The conductive plates 20 and 22, the dielectric material 24, and the conductive terminations 18 and 19 together serve as the MLC component of the hybrid capacitor 10. Where the conductive plates 20 and 22 are non-equidistantly spaced, the dielectric material 24 between the plates may consist of a different dielectric material between each adjacent pair of plates.

Below the outer-most bottom plate of the conductive plates 20 is a second dielectric material 26. The dielectric material 26 is different from the dielectric material 24. Although the dielectric material 26 may also be a ceramic, it will have a different relative dielectric constant than dielectric material 24. It will usually be lower than the relative dielectric constant of the dielectric material 24 and will typically be in the range of 10 to 900.

Below the dielectric material 26 is a third conductive plate 28 electrically connected to the conductive termination 19. In the embodiment depicted in FIG. 2, conductive plate 28 is much shorter than the conductive plates 20 and 22 and therefore overlaps the lowermost of the conductive plates 20 much less than the conductive plates 20 and 22 overlap each other. The conductive plate 28 is typically composed of the same material as conductive plates 20 and 22. The conductive plate 28, the dielectric material 26, the lowermost of conductive plates 20, and the conductive terminations 18 and 19 together comprise the SLC component of the hybrid capacitor 10 which is electrically in parallel with the MLC component of the hybrid capacitor 10.

Capacitance is governed by the equation:

$$C = A\epsilon_r \epsilon_o / d$$

Where: C is the capacitance;

A is the area of overlap of the plates;

$\epsilon_r$ is the relative permittivity (i.e. relative dielectric constant) of the material between the plates;

$\epsilon_o$ is the permittivity (i.e. dielectric constant) of air (=8.854×10$^{-12}$ Farads/meter);

d is the distance between the plates.

In the present embodiment, the difference in the area of overlap of the plates of the SLC and the relative dielectric constant of the dielectric material between the plates of the SLC from those of the MLC means that the capacitance of the SLC component of the hybrid capacitor 10 is significantly lower than the capacitance of the MLC component of the hybrid capacitor 10. Generally, the area of overlay "A" and the relative dielectric constant "$\epsilon_r$" of an SLC will be chosen to result in a lower capacitance value for an SLC than an MLC. This is because an MLC is typically used for low frequency applications and an SLC is typically used of high frequency applications.

The desired capacitance values may be achieved by choosing the dielectric material 26 to have a relative dielectric constant which is significantly lower than the relative dielectric constant of the dielectric material 24. It may also be achieved by having the area of overlap of the plates making up the MLC be significantly larger in area than the area of overlap of the plates making up the SLC. Other capacitance values can be achieved by altering the spacing of the plates of the SLC and thereby changing the thickness of the dielectric material 26. Alternatively, the desired effect may be achieved by manipulating all of these variables.

Figure 3:
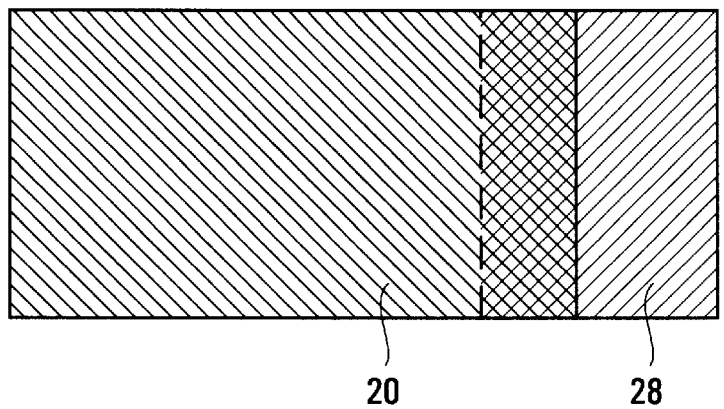
FIG. 3 is a top view of the plates which comprise the SLC component of the hybrid capacitor of the present invention.

FIGS. 3 through 6 depict top views of various shapes for the plate 28 and the lowermost plate of the conductive plates 20. The different shapes result in differing areas of overlap (as indicated by the overlapped shading) and differing capacitance values. In particular, FIG. 3 shows a configuration wherein the lowermost plate of the conductive plates 20 has the same geometry as the other conductive plates 20. In contrast, the conductive plate 28 is the same width as the conductive plates 22 but is much shorter in length.

Figure 4:
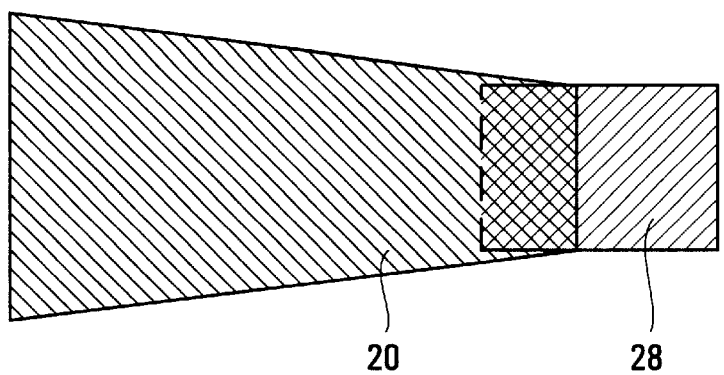
FIG. 4 depicts an alternative geometry for the plates which comprise the SLC component of the hybrid capacitor of the present invention.

FIG. 4 shows a configuration wherein the lowermost plate of the conductive plates 20 has a truncated triangular shape wherein it is as wide as the other conductive plates 20 at the place of attachment to conductive termination 18 but it tapers in a substantially triangular manner in its direction of extension towards conductive plate 28 such that a narrow end extends over the conductive plate 28. The conductive plate 28 is rectangular but significantly narrower and shorter than the conductive plates 22.

Figure 5:
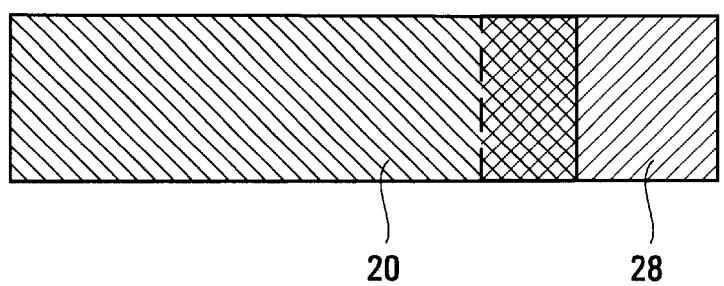
FIG. 5 depicts another alternative geometry for the plates which comprise the SLC component of the hybrid capacitor of the present invention.

FIG. 5 shows a configuration wherein the lowermost plate of the conductive plates 20 is rectangular and the same length as the other conductive plates 20 but is significantly narrower. The conductive plate 28 is rectangular but significantly narrower and shorter than the conductive plates 22.

Figure 6:
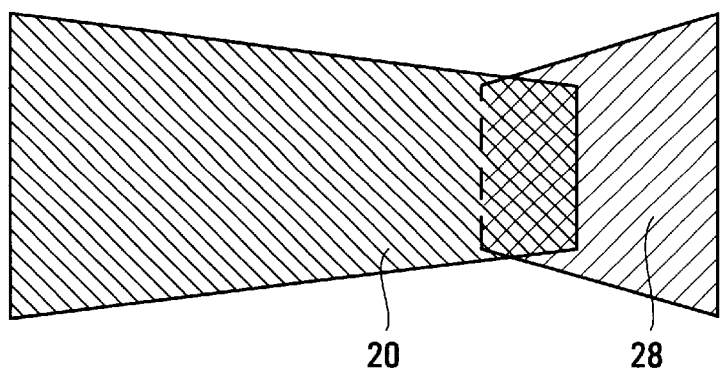
FIG. 6 depicts a further alternative geometry for the plates which comprise the SLC component of the hybrid capacitor of the present invention.

FIG. 6 shows a configuration wherein the lowermost plate of the conductive plates 20 has a truncated triangular shape wherein it is as wide as the other conductive plates 20 at the place of attachment to conductive termination 18 but it tapers in a substantially triangular manner in its direction of extension towards conductive plate 28 such that a narrow end extends over the conductive plate 28. Similarly, the conductive plate 28 has a truncated triangular shape wherein it is as wide as the conductive plates 22 at the place of attachment to the conductive termination 19 but it tapers in a substantially triangular manner in its direction of extension towards the lowermost plate of the conductive plates 20 such that a narrow end extends below the lowermost of the conductive plates 20. The conductive plate 28 is also significantly shorter than the conductive plates 22.

Although a variety of SLC plate shapes are shown in FIGS. 3 through 6, other shapes are possible. For example, the edges of the plates in FIG. 6 could be tapered in a. curved rather than linear manner.

The hybrid capacitor 10 is attached to the substrate 12 with the SLC component of the hybrid capacitor 10 closest to the substrate 12 to maximize high frequency performance. Assembly is aided by the orientation dot 30 which indicates the upper surface of the hybrid capacitor 10.

The hybrid capacitor 10 of the present invention can be constructed in the conventional manner of surface-mount MLCs.

The above description of embodiments should not be interpreted in any limiting manner since variations and refinements can be made without departing from the spirit of the invention. The scope of the invention is defined by the appended claims and their equivalents.

I claim:
1. A surface-mount hybrid MLC (multi-layer capacitor) and SLC (single layer capacitor) comprising:
   a plurality of parallel first conductive plates electrically connected to a first conductive termination;
   a plurality of parallel second conductive plates electrically connected to a second conductive termination, said second conductive plates being interleaved with said first conductive plates and spaced apart from said first conductive plates by a first dielectric material, one of said second conductive plates being an outer second conductive plate, said outer second conductive plate being an outermost plate of the plurality of parallel first arid second conductive plates;
   a third conductive plate electrically connected to said first conductive termination parallel to and adjacent to said outer second conductive plate and spaced apart from said outer second conductive plate by a second dielectric material;
   the first and second conductive plates, the first dielectric material and the first and second conductive terminations serving as an MLC and the outer second conductive plate, the third conductive plate, the second dielectric material and the first and second terminations serving as an SLC connected in parallel to the MLC.

2. The capacitor of claim 1 wherein said first conductive plates and said second conductive plates are substantially identical.

3. The capacitor of claim 1 wherein said third condutive plate is significantly smaller than said first conductive plates and said second condutive plates.

4. The capacitor of claim 1 wherein said outer second conductive plate is substantially triangular with a narrow end extending over said third conductive plate.

5. The capacitor of claim 1 wherein said outer second conductive plate and said third conductive plate are narrow and rectangular.

6. The capacitor of claim 1 wherein said outer second conductive plate and said third conductive plate are substantially triangular with narrow ends overlapping.

7. The capacitor of claim 1 wherein said outer second conductive plate is of a size substantially the same as the rest of said second conductive plates and said third conductive plate is much shorter.

8. The capacitor of claim 1 wherein said conductive plates are equidistantly spaced.

9. The capacitor of claim 1 wherein said conductive plates are comprised of palladium.

10. The capacitor of claim 1 wherein the relative dielectric constant of said first dielectric material is in the range of 70 to 1200.

11. The capacitor of claim 1 wherein the relative dielectric constant of said second dielectric material is in the range of 10 to 900.

12. The capacitor of claim 1 wherein the relative dielectric constant of said second dielectric material is significantly lower than the relative dielectric constant of said first dielectric material.

13. The capacitor of claim 1 wherein the area of overlap of the first conductive plates over the second conductive plates is significantly larger than the area of overlap of the outer second conductive plate and the third conductive plate.

14. The capacitor of claim 1 wherein the relative dielectric constant of said second dielectric material is lower than the relative dielectric constant of said first dielectric material and the area of overlap of the first conductive plates over the second conductive plates is larger than the area of overlap of the outer second conductive plate and the third conductive plate.

15. The capacitor of claim 1 wherein the capacitor has a visual indicator which identifies the relative position of the SLC.

16. The capacitor of claim 1 wherein it is mounted on a substrate with the SLC closest to the substrate.

17. The capacitor of claim 1 wherein said capacitor is rectangular and said first conductive termination and said second conductive termination are at opposite ends of said capacitor.

18. A surface-mount capacitor comprising:
   a unitary body;
   a first conductive termination at one end;
   a second conductive termination at an opposite end from said first conductive termination;
   an MLC (multi-layer capacitor) within said unitary body which employs said first conductive termination and said second conductive termination as the terminations of said MLC and wherein said MLC comprises a first dielectric material;
   an SLC (single layer capacitor) within said unitary body which employs said first conductive termination and said second conductive termination as the terminations of said SLC;
   such that said MLC and said SLC comprise a single capacitor component and wherein said SLC comprises a second dialectric material.

19. The capacitor of claim 18 wherein the said MLC comprises:
   a plurality of parallel first conductive plates electrically connected to said first conductive termination;
   a plurality of parallel second conductive plates electrically connected to said second conductive termination, said second conductive plates being interleaved with said first conductive plates and spaced apart from said first conductive plates by said first dielectric material.

20. The capacitor of claim 19 wherein the said SLC comprises:
   one of said second conductive plates which is an outer second conductive plate;
   a third conductive plate electrically connected to said first conductive termination parallel to and adjacent to said outer second conductive plate and spaced apart from said outer second conductive plate by said second dielectric material.

21. The capacitor of claim 18 wherein it is mounted on a substrate with the SLC closest to the substrate.

22. The capacitor of claim 18 wherein said MLC has a capacitance value between 0.1 pico-Farads and 0.2 micro-Farads and said SLC has a capacitance value of between 0.05 pico-Farads and 1800 pico-Farads.

23. A surface-mount hybrid MLC (multi-layer capacitor) and SLC (single layer capacitor) comprising:
   a plurality of parallel non-equidistantly spaced first conductive plates electrically connected to a first conductive termination;
   a plurality of parallel non-equidistantly spaced second conductive plates electrically connected to a second conductive termination, said second conductive plates being interleaved with said first conductive plates and spaced apart from said first conductive plates by plurality of first dielectric materials, one of said second conductive plates being an outer second conductive plate;
   a third conductive plate electrically connected to said first conductive termination parallel to and adjacent to said outer second conductive plate and spaced apart from said outer second conductive plate by a second dielectric material;
   the first and second conductive plates, the first dielectric materials and the first and second conductive terminations serving as an MLC and the outer second conductive plate, the third conductive plate, the second dielectric material and the first and second terminations serving as an SLC connected in parallel to the MLC.

24. The capacitor of claim 23 wherein the relative dielectric constant of said second dielectric material is significantly lower than the relative dielectric constants of said first dielectric materials.

* * * * *